(12) United States Patent
McKittrick et al.

(10) Patent No.: US 11,469,603 B1
(45) Date of Patent: Oct. 11, 2022

(54) BIDIRECTIONAL CHARGING SYSTEM FOR A STYLUS OF AN INFORMATION HANDLING SYSTEM

(71) Applicant: Dell Products L.P., Round Rock, TX (US)

(72) Inventors: Allen B. McKittrick, Cedar Park, TX (US); Christopher Barnard, Austin, TX (US); Deeder Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/448,101

(22) Filed: Sep. 20, 2021

(51) Int. Cl.
*H02J 7/00* (2006.01)
*G06F 3/02* (2006.01)
*G06F 3/0354* (2013.01)

(52) U.S. Cl.
CPC ............ *H02J 7/0044* (2013.01); *G06F 3/021* (2013.01); *G06F 3/03545* (2013.01)

(58) Field of Classification Search
CPC ... G06F 3/03545; G06F 1/3212; G06F 1/3215
USPC .......................... 320/107; 345/173, 174, 179
See application file for complete search history.

(56) References Cited

U.S. PATENT DOCUMENTS

| | | | | |
|---|---|---|---|---|
| 2011/0162894 A1* | 7/2011 | Weber | .................. | G06F 3/03545 |
| | | | | 178/19.03 |
| 2015/0349831 A1* | 12/2015 | Young | ..................... | H04M 1/04 |
| | | | | 455/575.8 |
| 2018/0095653 A1* | 4/2018 | Hasek | .................. | G06F 3/04883 |
| 2021/0096605 A1* | 4/2021 | Bailey | ................... | G06F 1/1681 |

* cited by examiner

*Primary Examiner* — Calvin C Ma
(74) *Attorney, Agent, or Firm* — McDermott Will & Emery

(57) ABSTRACT

In one embodiment, a method for charging a stylus of an information handling system includes: receiving, by a stylus docking slot of a keyboard of the information handling system, the stylus, the keyboard communicably coupled to the information handling system; causing, by a plurality of keyboard magnets of the keyboard, a partial alignment of the stylus in relation to the stylus docking slot, the plurality of keyboard magnets attracting a plurality of stylus magnets of the stylus; causing, by an alignment nub of the keyboard, an alignment of one or more spring contacts of the stylus in relation to one or more charging contacts of the keyboard, the alignment nub configured to removably couple to a beveled recess of the stylus; and providing, by the one or more charging contacts, power to an energy storage unit of the stylus via the one or more spring contacts.

20 Claims, 5 Drawing Sheets

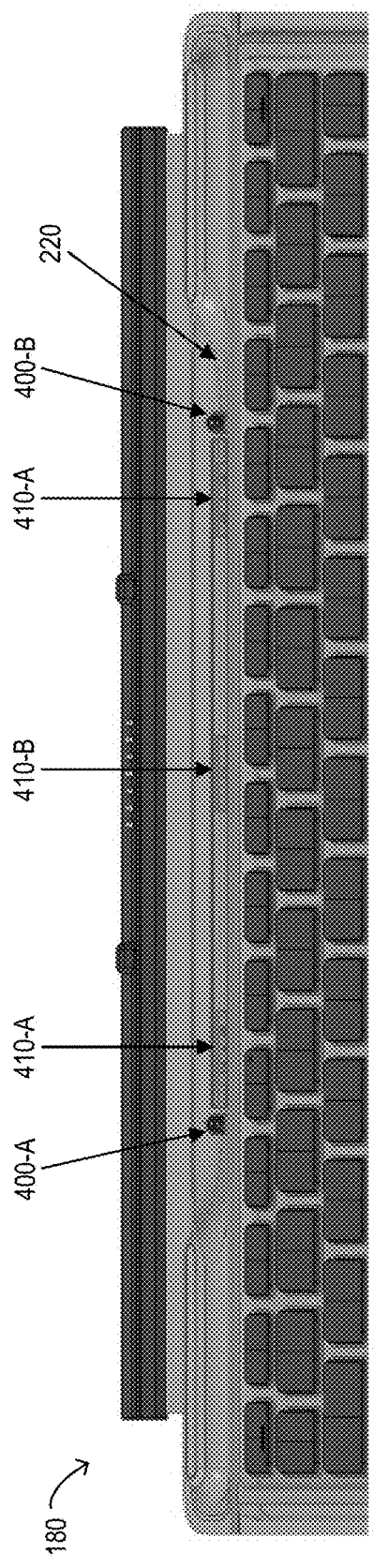
FIG. 4A
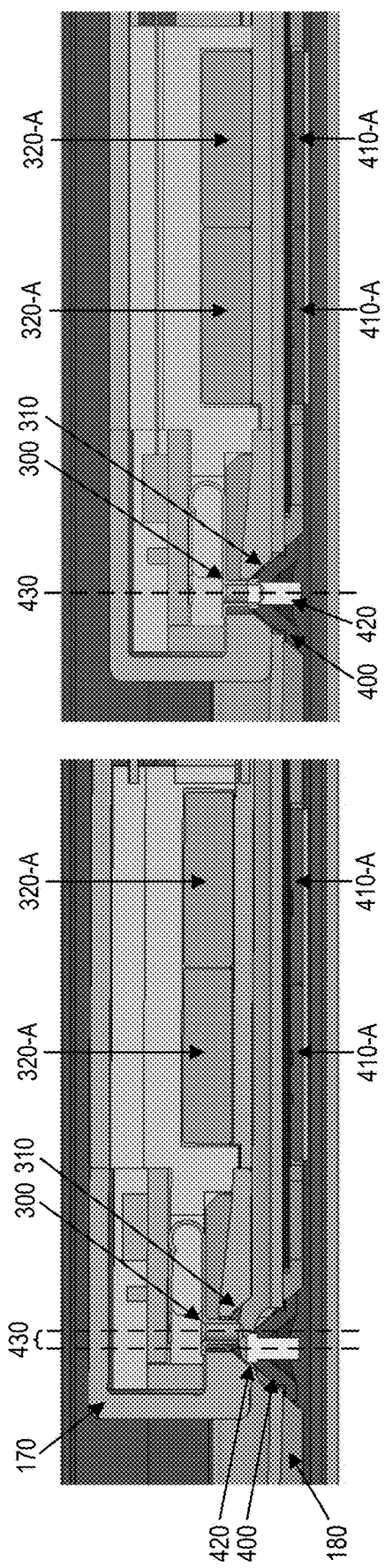
FIG. 4B
FIG. 4C

500

```
┌─────────────────────────────────────────────────────────────────────────┐
│   RECEIVE, BY A STYLUS DOCKING SLOT OF A KEYBOARD OF AN INFORMATION     │
│                      HANDLING SYSTEM, A STYLUS.                         │
│                                   510                                   │
└─────────────────────────────────────────────────────────────────────────┘
                                     │
                                     ▼
┌─────────────────────────────────────────────────────────────────────────┐
│  CAUSE, BY KEYBOARD MAGNETS OF THE KEYBOARD, A PARTIAL ALIGNMENT OF THE │
│           STYLUS IN RELATION TO THE STYLUS DOCKING SLOT.                │
│                                   520                                   │
└─────────────────────────────────────────────────────────────────────────┘
                                     │
                                     ▼
┌─────────────────────────────────────────────────────────────────────────┐
│   CAUSE, BY AN ALIGNMENT NUB OF THE KEYBOARD, AN ALIGNMENT OF SPRING    │
│   CONTACTS OF THE STYLUS IN RELATION TO CHARGING CONTACTS OF THE        │
│                              KEYBOARD.                                  │
│                                   530                                   │
└─────────────────────────────────────────────────────────────────────────┘
                                     │
                                     ▼
┌─────────────────────────────────────────────────────────────────────────┐
│ PROVIDE, BY THE CHARGING CONTACTS, POWER TO AN ENERGY STORAGE UNIT OF   │
│   THE STYLUS VIA THE SPRING CONTACTS TO CHARGE THE STYLUS FOR USE.      │
│                                   540                                   │
└─────────────────────────────────────────────────────────────────────────┘
```

FIG. 5

BIDIRECTIONAL CHARGING SYSTEM FOR A STYLUS OF AN INFORMATION HANDLING SYSTEM

BACKGROUND

Field of the Disclosure

The disclosure relates generally to information handling systems, and in particular to a bidirectional charging system for a stylus of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed method for charging a stylus of an information handling system includes: receiving, by a stylus docking slot of a keyboard of the information handling system, the stylus, the keyboard communicably coupled to the information handling system; causing, by a plurality of keyboard magnets of the keyboard, a partial alignment of the stylus in relation to the stylus docking slot, the plurality of keyboard magnets attracting a plurality of stylus magnets of the stylus; causing, by an alignment nub of the keyboard, an alignment of one or more spring contacts of the stylus in relation to one or more charging contacts of the keyboard, the alignment nub configured to removably couple to a beveled recess of the stylus; and providing, by the one or more charging contacts, power to an energy storage unit of the stylus via the one or more spring contacts to charge the stylus for use, the power generated by a battery of the information handling system.

In one or more of the disclosed embodiments, the stylus docking slot includes an additional alignment nub disposed opposite the alignment nub, the additional alignment nub including an additional one or more charging contacts disposed within the additional alignment nub.

In one or more of the disclosed embodiments, the method further includes: causing, by the additional alignment nub, an additional alignment of the one or more spring contacts in relation to the additional one or more charging contacts, the additional alignment nub configured to removably couple to the beveled recess.

In one or more of the disclosed embodiments, the one or more spring contacts are disposed within the beveled recess of the stylus.

In one or more of the disclosed embodiments, the one or more charging contacts are disposed within the alignment nub.

In one or more of the disclosed embodiments, the plurality of keyboard magnets is disposed within the stylus docking slot.

In one or more of the disclosed embodiments, the energy storage unit is an electric double-layer capacitor (EDLC).

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 4A-4C illustrate selected elements of an embodiment of a bidirectional charging system providing power to a stylus of an information handling system.

FIG. 5 is a flowchart depicting selected elements of an embodiment of a method for charging a stylus of an information handling system.

DESCRIPTION OF PARTICULAR EMBODIMENT(S)

Figure 1:
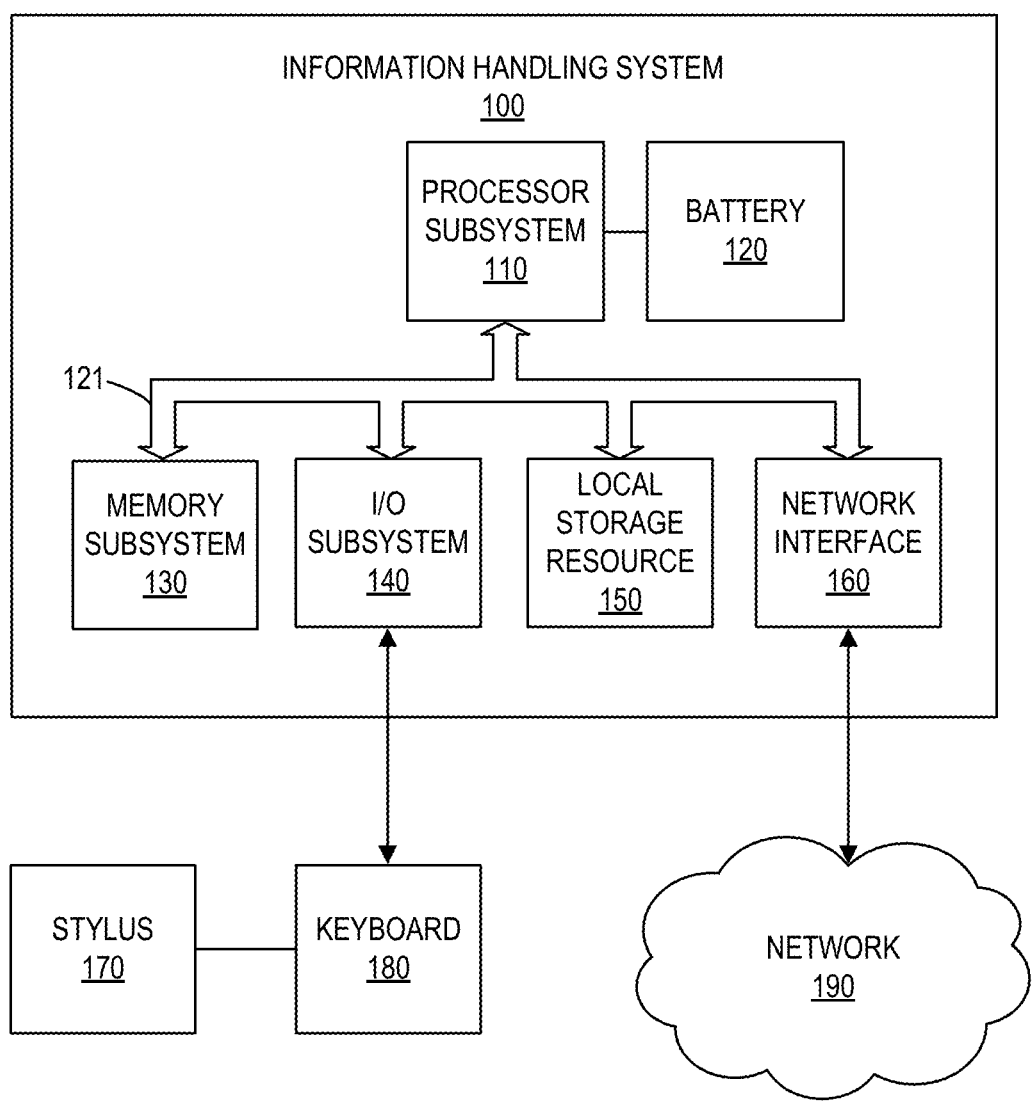
FIG. 1 is a block diagram of selected elements of an embodiment of a computing environment that includes an information handling system and a bidirectional charging system.

This document describes a method for charging a stylus of an information handling system that includes: receiving, by a stylus docking slot of a keyboard of the information handling system, the stylus, the keyboard communicably coupled to the information handling system; causing, by a plurality of keyboard magnets of the keyboard, a partial alignment of the stylus in relation to the stylus docking slot, the plurality of keyboard magnets attracting a plurality of stylus magnets of the stylus; causing, by an alignment nub of the keyboard, an alignment of one or more spring contacts of the stylus in relation to one or more charging contacts of the keyboard, the alignment nub configured to removably couple to a beveled recess of the stylus; and providing, by the one or more charging contacts, power to an energy storage unit of the stylus via the one or more spring contacts to charge the stylus for use, the power generated by a battery of the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 110, which may comprise one or more processors, and system bus 121 that communicatively couples various system components to processor subsystem 110 including, for example, a battery 120, a memory subsystem 130, an I/O subsystem 140, a local storage resource 150, and a network interface 160. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, HyperTransport (HT) bus, and Video Electronics Standards Association (VESA) local bus. As shown in FIG. 1, information handling system 100 may additionally include a keyboard 180 (e.g., coupled to I/O subsystem 140) and a stylus 170. In other embodiments, computing environment 195 may include additional, fewer, and/or different components than the components shown in FIG. 1.

In information handling system 100, processor subsystem 110 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 110 may interpret and/or execute program instructions and/or process data stored locally (e.g., in memory subsystem 130 and/or another component of information handling system 100). In the same or alternative embodiments, processor subsystem 110 may interpret and/or execute program instructions and/or process data stored remotely. In one embodiment, processor subsystem 110 may be or include a multi-core processor comprised of one or more processing cores disposed upon an integrated circuit (IC) chip. In other embodiments, processor subsystem 110 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 140 may comprise a system, device, or apparatus generally operable to receive and/or transmit data to, from, and/or within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 160 may be a suitable system, apparatus, or device operable to serve as an interface between information handling system 100 and a network 190. Network interface 160 may enable information handling system 100 to communicate over network 190 using a suitable transmission protocol and/or standard, including, but not limited to, transmission protocols and/or standards enumerated below with respect to the discussion of network 190. Network 190 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 190 may include one or more routers for routing data between client information handling systems 100 and server information handling systems 100. A device (e.g., a client information handling system 100 or a server information handling system 100) on network 190 may be addressed by a corresponding network address including, for example, an Internet protocol (IP) address, an Internet name, a Windows Internet name service (WINS) name, a domain name or other system name. In particular embodiments, network 190 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 190 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 190 and its various components may be implemented using hardware, software, or any combination thereof.

In one embodiment, battery 120 may be a suitable system, apparatus, or device operable to generate and provide power to one or more components of information handling system 100. In particular, battery 120 may be or include one or more electrochemical cells with external connections for providing power to stylus 170 via keyboard 180. In one embodiment, battery 120 may be coupled to keyboard 180 such that battery 120 may generate and provide power to one or more components of keyboard 180. For example, battery 120 may generate and provide power to charging contacts 420 (shown in FIGS. 4B and 4C) of keyboard 180 such that keyboard 180 may provide the power generated by battery 120 to stylus 170. The power provided to stylus 170 may charge stylus 170 for use. Battery 120 is described in further detail with respect to FIGS. 2A-4.

In one embodiment, stylus 170 may be a suitable system, apparatus, or device operable to receive input from a user of information handling system 100. Specifically, stylus 170 may be or include a pen-shaped I/O device configured to be held by a user such that the user may provide spatial data to information handling system 100 using physical gestures (e.g., writing on a screen of information handling system 100). As described above, stylus 170 may receive power generated by battery 120 such that stylus 170 may be charged for use. Conventional styluses may rely on a wireless charging interface to receive power during a charging process. However, such conventional charging processes may result in slow, or no, charging rates as misalignment may occur between the stylus and the wireless charging interface. As such, conventional styluses may require extended charge times (e.g., 75 minutes) before storing a sufficient charge for use, thereby decreasing efficiency and overall user experience. In contrast, stylus 170 may include an internal energy storage unit (e.g., energy storage unit 330 shown in FIG. 3) operable to receive power generated by battery 120 via keyboard 180. In particular, stylus 170 may be configured to couple with one or more components of keyboard 180 such that the charge time may be reduced (e.g., 5 minutes) from that of conventional styluses employing a wireless charging interface, thereby increasing efficiency and overall user experience. Stylus 170 is described in further detail with respect to FIGS. 2A-4.

In one embodiment, keyboard 180 may be a suitable system, apparatus, or device operable to receive input from a user of information handling system 100. In particular, keyboard 180 may be or include a peripheral hardware device used to input text, characters, and/or other commands into information handling system 100. In one embodiment, keyboard 180 may be communicatively coupled to I/O subsystem 140 of information handling system 100 via a wired connection (e.g., via USB connection). In another embodiment, keyboard 180 may be communicatively coupled to I/O subsystem 140 of information handling system 100 via wireless connection (e.g., via radio frequency, infrared, Bluetooth technology, and the like). In the embodiment illustrated in FIG. 1, keyboard 180 may be or include a detachable keyboard that may be communicably coupled with information handling system 100 and/or detached from information handling system 100. For example, information handling system 100 may be or include a 2-in-1 convertible laptop or detachable tablet supporting both touchscreen and keyboard input functionality. In this example, keyboard 180 may be detached from information handling system 100 allowing the user to input text, characters, and/or other commands via touchscreen and/or stylus 170. In one embodiment, keyboard 180 may receive power from information handling system 100 (e.g., from battery 120) via one or more terminals such that keyboard 180 may provide power to stylus 170 to charge stylus 170 for use. Keyboard 180 is described in further detail with respect to FIGS. 2A-4.

Figure 2A:
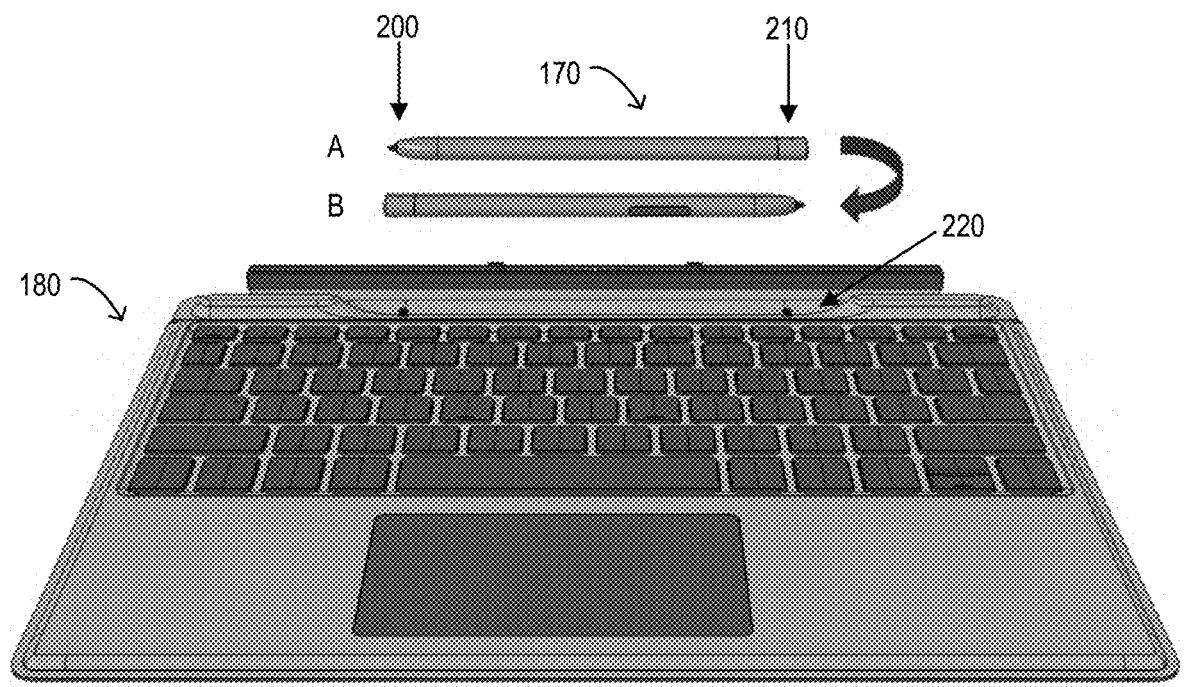
FIGS. 2A and 2B illustrate selected elements of an embodiment of a bidirectional charging system.
Figure 2B:
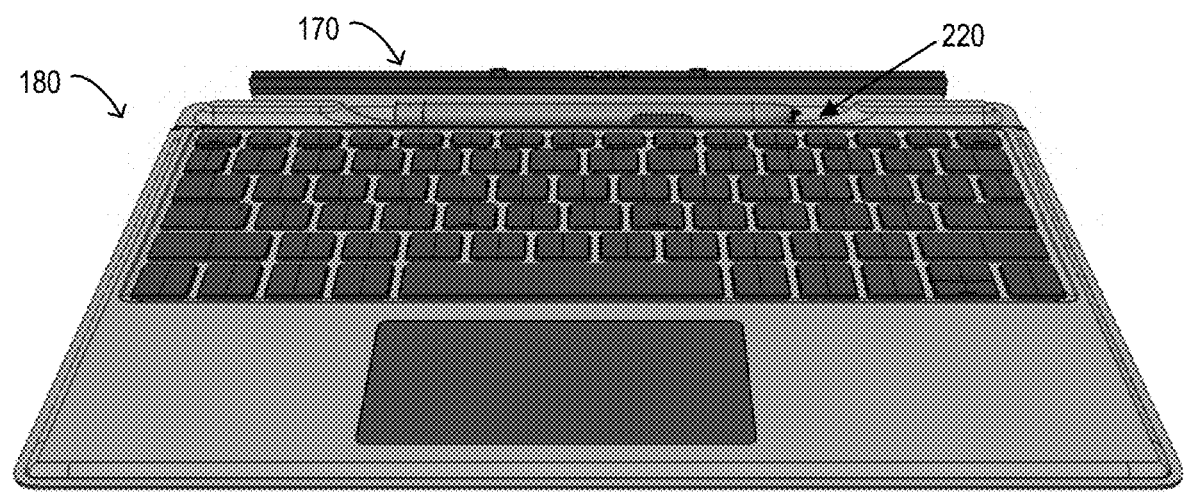

FIGS. 2A and 2B illustrate selected elements of an embodiment of a bidirectional charging system. In the embodiment illustrated in FIGS. 2A and 2B, the bidirectional charging system includes stylus 170 and keyboard 180. Stylus 170 includes tip 200 and endcap 210. Keyboard 180 includes stylus docking slot 220. In other embodiments, the bidirectional charging system may include additional, fewer, and/or different components than the components shown in FIGS. 2A and 2B.

In the embodiment illustrated in FIG. 2A, stylus 170 may be configured, or otherwise contoured, to be received by stylus docking slot 220 of keyboard 180. In particular, stylus 170 may be received by stylus docking slot 220 to receive power via one or more components (e.g., charging contacts 420 shown in FIGS. 4B and 4C) of keyboard 180. Here, stylus 170 may be received by stylus docking slot 220 in a bidirectional manner. This is shown in FIG. 2A where stylus 170 may be oriented in direction A or direction B in relation to stylus docking slot 220. Specifically, direction A and direction B may be opposite in orientation (where tip 200 and endcap 210 of stylus 170 are shown to be on opposite ends from direction A to direction B). That is, stylus 170 may be received by stylus docking slot 220 in either direction A or direction B such that stylus 170 may receive power (e.g., generated by battery 120) via one or more components of keyboard 180 to charge stylus 170 for use.

In the embodiment illustrated in FIG. 2B, stylus 170 has been received by stylus docking slot 220 of keyboard 180 in direction B (shown in FIG. 2A). For example, a user of information handling system 100 may have placed stylus 170 into stylus docking slot 220 of keyboard 180 for charging after using stylus 170 for providing input to information handling system 100. In this example, the user has placed stylus 170 into stylus docking slot 220 for charging in direction B. However, in another example, the user may place stylus 170 into stylus docking slot 220 for charging in direction A. As such, the bidirectional charging system may allow the user to quickly and easily place stylus 170 into stylus docking slot 220 in either one of two opposite orientations (i.e., direction A and direction B) such that stylus 170 may receive power and become charged for use.

Figure 3:
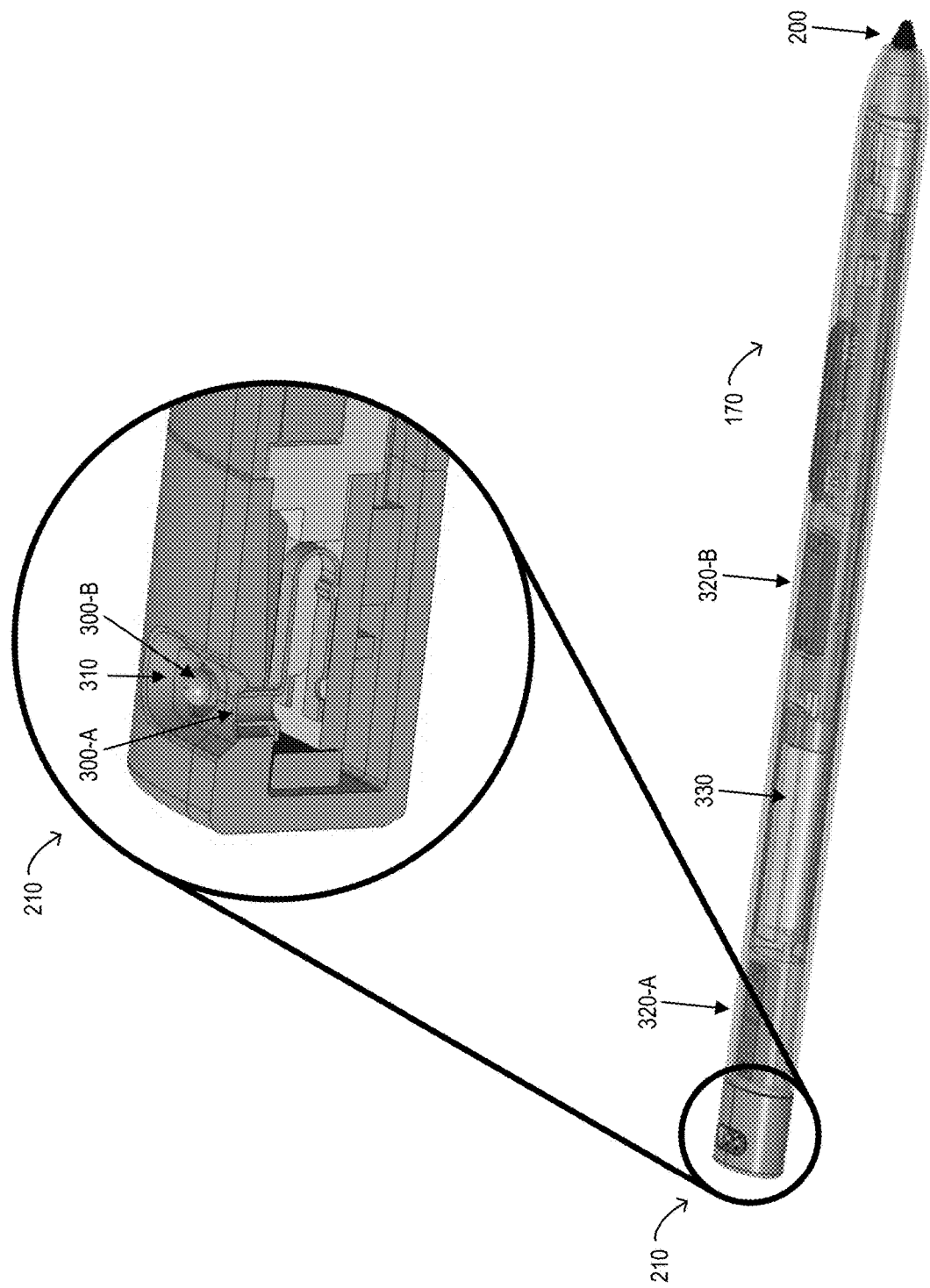
FIG. 3 illustrates selected elements of an embodiment of a stylus of an information handling system.

FIG. 3 illustrates selected elements of an embodiment of a stylus of an information handling system. In the embodiment illustrated in FIG. 3, stylus 170 includes endcap 210, stylus magnets 320-A and 320-B (collectively referred to herein as "stylus magnets 320"), energy storage unit 330, and tip 200. Endcap 210 includes spring contacts 300-A and 300-B (collectively referred to herein as "spring contacts 300") and beveled recess 310. In other embodiments, stylus 170 may include additional, fewer, and/or different components than the components shown in FIG. 3.

In one embodiment, endcap 210 may be a suitable system, apparatus, or device operable to house one or more components of stylus 170. In particular, endcap 210 may be or include a rigid material operable to house spring contacts 300 within beveled recess 310 of endcap 210. As shown in FIG. 3, spring contacts 300 may be disposed within beveled recess 310 such that spring contacts 300 may receive power via keyboard 180 (e.g., via charging contacts 420 shown in FIGS. 4B and 4C) when stylus 170 is received by stylus docking slot 220 to charge stylus 170 for use. Specifically, spring contacts 300-A and 300-B may be comprised of a conductive material (e.g., copper, gold-plated alloy, and the like) and may have opposite electrical polarities (i.e., positive and negative electrical polarities) such that spring contacts 300 may electrically couple with one or more components (e.g., charging contacts 420 shown in FIGS. 4B and 4C) of keyboard 180 to charge stylus 170 for use. Here, beveled recess 310 of stylus 170 may removably couple with one or more components (e.g., alignment nubs 400-A or 400-B shown in FIG. 4A) of keyboard 180 to align spring contacts 300 with charging contacts 420 such that energy storage unit 330 may receive power via keyboard 180.

In one embodiment, energy storage unit 330 may be a suitable system, apparatus, or device operable to store power to be consumed by stylus 170. In particular, energy storage unit 330 may be or include an electric energy storage system (e.g., a supercapacitor) operable to store power generated by battery 120 such that stylus 170 may be charged for use. In one embodiment, energy storage unit 330 may be or include an electric double-layer capacitor (EDLC) having porous electrodes disposed in an electric double layer within energy storage unit 330 operable to quickly become charged through potential-induced adsorption on the surfaces of the porous electrodes (i.e., electrosorption). In this embodiment, energy storage unit 330 may become charged quickly while maintaining a relatively low energy density in relation to conventional batteries. In other embodiments, energy storage unit 330 may be or include one or more lithium batteries, rechargeable lithium-ion batteries, AAAA (Quad A) batteries, and/or any other type of energy storage unit suitable for storing power to be consumed by stylus 170.

In one embodiment, each stylus magnet 320 may be a suitable system, apparatus, or device operable to cause a partial alignment of stylus 170 in relation to stylus docking slot 220. Specifically, stylus magnets 320 may be disposed within stylus 170 (e.g., housed within an outer surface of stylus 170) such that stylus magnets 320 may be attracted by one or more components (e.g., keyboard magnets 410A and 410B shown in FIG. 4A) of keyboard 180 to cause a partial alignment of stylus 170 in relation to stylus docking slot 220. That is, stylus magnets 320-A may be attracted to a magnetic field generated by either set of keyboard magnets 410-A (shown in FIG. 4A) disposed within stylus docking slot 220 to support the bidirectional charging scheme described above with respect to FIGS. 2A and 2B. For example, stylus magnets 320-A may be attracted by keyboard magnets 410-A shown on the left side of stylus docking slot 220 in FIG. 4A for stylus 170 to be received by stylus docking slot 220 in direction B shown in FIG. 2A. Similarly, in another example, stylus magnets 320-A may be attracted by keyboard magnets 410-A shown on the right side of stylus docking slot 220 shown in FIG. 4A for stylus 170 to be received by stylus docking slot 220 in direction A shown in FIG. 2B. In addition, stylus magnets 320-B may be attracted to a magnetic field generated by keyboard magnets 410-B (shown in FIG. 4A) disposed within stylus docking slot 220 to further support the partial alignment of stylus 170 in relation to stylus docking slot 220. By causing a partial alignment of stylus 170 in relation to stylus docking slot 220, stylus magnets 320 (and keyboard magnets 410 shown in FIG. 4A) allow a user to quickly and easily place stylus 170 into stylus docking slot 220 in either one of two opposite orientations (i.e., direction A and direction B shown in FIG. 2B) such that stylus 170 may receive power and become charged for use.

FIGS. 4A-4C illustrate selected elements of an embodiment of a bidirectional charging system providing power to a stylus of an information handling system. In the embodiment illustrated in FIGS. 4A-4C, the bidirectional charging system includes stylus 170 and keyboard 180 as described above with respect to FIGS. 2A and 2B. Stylus 170 includes endcap 210, stylus magnets 320, energy storage unit 330, and tip 200 as described above with respect to FIG. 3. Endcap 210 includes spring contacts 300 and beveled recess 310 as described above with respect to FIG. 3. Keyboard 180 includes stylus docking slot 220 as described above with respect to FIGS. 2A and 2B. Stylus docking slot 220 includes keyboard magnets 410-A and 410-B as described above with respect to FIG. 3. Stylus docking slot 220 additionally includes alignment nubs 400-A and 400-B (collectively referred to herein as "alignment nubs 400") that each include charging contacts 420. In one embodiment, charging contacts 420 may be comprised of a conductive material (e.g., copper, gold-plated alloy, and the like) and may have opposite electrical polarities (i.e., positive and negative electrical polarities) such that charging contacts 420 may electrically couple with spring contacts 300 to charge stylus 170 for use. In other embodiments, the bidirectional charging system may include additional, fewer, and/or different components than the components shown in FIGS. 4A-4C.

In one embodiment, each alignment nub 400 may be a suitable system, apparatus, or device operable to cause an alignment of stylus 170 in relation to stylus docking slot 220. In particular, each alignment nub 400 may be or include a rigid protrusion (i.e., a nub) extending from the surface of stylus docking slot 220 configured to removably couple to beveled recess 310 (shown in FIG. 3) of stylus 170. That is, beveled recess 310 may be configured, or otherwise contoured, to be removably coupled to alignment nub 400 such that stylus 170 may be properly aligned with stylus docking slot 220 to receive power (e.g., generated by battery 120) via keyboard 180. Specifically, alignment nub 400 may cause spring contacts 300 disposed within beveled recess 310 of stylus 170 to be aligned in relation to charging contacts 420 disposed within alignment nub 400. As shown in FIG. 4A, alignment nub 400-A may be disposed opposite alignment nub 400-B within stylus docking slot 220. Here, alignment nub 400-A may cause stylus 170 to be aligned in relation to stylus docking slot 220 in direction B (shown in FIG. 2A). For example, a user may place stylus 170 into stylus docking slot 220 in direction B such that alignment nub 400-A may cause spring contacts 300 disposed within beveled recess 310 of stylus 170 to be properly aligned in relation to charging contacts 420 disposed within alignment nub 400-A of keyboard 180. Similarly, alignment nub 400-B may cause stylus 170 to be aligned in relation to stylus docking slot 220 in direction A (shown in FIG. 2A). For example, rather than placing stylus 170 into stylus docking slot 220 in direction B as described above, the user may wish to place stylus 170 into stylus docking slot 220 in direction A such that alignment nub 400-B may cause spring contacts 300 disposed within beveled recess 310 of stylus 170 to be properly aligned in relation to charging contacts 420 disposed within alignment nub 400-B of keyboard 180. Alignment nub 400 is described in further detail with respect to FIGS. 4B and 4C.

In the embodiment illustrated in FIG. 4B, stylus 170 has been received by stylus docking slot 220 of keyboard 180 and has been partially aligned in relation to stylus docking slot 220. In particular, stylus magnets 320-A have been attracted to a magnetic field generated by keyboard magnets 410-A disposed within stylus docking slot 220 causing a partial alignment of stylus 170 in relation to stylus docking slot 220. As shown in FIG. 4B, such partial alignment may cause a gap 430 preventing beveled recess 310 of stylus 170 and alignment nub 400 from becoming properly aligned. That is, gap 430 may prevent each spring contact 300 disposed within beveled recess 310 from becoming aligned with each charging contact 420 disposed in alignment nub 400, thereby preventing each spring contact 300 from receiving power via each charging contact 420.

In the embodiment illustrated in FIG. 4C, stylus 170 has been aligned in relation to stylus docking slot 220 and may be receiving power from battery 120 via charging contacts 420 of keyboard 180. Specifically, each spring contact 300 disposed within beveled recess 310 has been aligned with each charging contact 420 disposed in alignment nub 400, thereby allowing each spring contact 300 to receive power via each charging contact 420. As shown in FIG. 4C, alignment nub 400 is removably coupled to beveled recess 310 such that gap 430 (shown in FIG. 4B) has diminished to properly align each spring contact 300 with each charging contact 420. That is, alignment nub 400 has caused an alignment of spring contacts 300 of stylus 170 in relation to charging contacts 420 of keyboard 180. Once aligned, charging contacts 420 may provide power to energy storage unit 330 of stylus 170 via spring contacts 300 to charge stylus 170 for use. By causing an alignment of spring contacts 300 in relation to charging contacts 420, the bidirectional charging system ensures that an optimal alignment is achieved for charging stylus 170, thereby increasing efficiency and overall user experience. Further, a user may decouple stylus 170 from stylus docking slot 220 of keyboard 180 (e.g., once energy storage unit 330 is fully charged) by simply removing stylus 170 from stylus docking slot 220 to begin using stylus 170 for input. For example, battery 120 of information handling system 100 may charge stylus 170 in 30 seconds via keyboard 180 such that stylus 170 may be removed from stylus docking slot 220 and used for 90 minutes by a user before requiring additional charge via keyboard 180.

FIG. 5 is a flowchart depicting selected elements of an embodiment of a method for charging a stylus of an information handling system. It is noted that certain operations described in method 500 may be optional or may be rearranged in different embodiments.

Method 500 may begin at step 510, where a stylus docking slot of a keyboard of the information handling system may receive the stylus. For example, stylus 170 may be configured, or otherwise contoured, to be received by stylus docking slot 220 of keyboard 180 in a bidirectional manner as described above with respect to FIG. 2A. In step 520, a plurality of keyboard magnets of the keyboard may cause a partial alignment of the stylus in relation to the stylus docking slot by attracting a plurality of stylus magnets of the stylus. For example, stylus magnets 320-A may be attracted to a magnetic field generated by keyboard magnets 410-A disposed within stylus docking slot 220 to cause a partial alignment of stylus 170 in relation to stylus docking slot 220 as described above with respect to FIG. 4B. In step 530, an alignment nub of the keyboard may cause an alignment of one or more spring contacts of the stylus in relation to one or more charging contacts of the keyboard. The alignment nub may be configured to removably couple to a beveled recess of the stylus. For example, alignment nub 400 may cause spring contacts 300 disposed within beveled recess 310 of stylus 170 to be aligned in relation to charging contacts 420 disposed within alignment nub 400 as described above with respect to FIGS. 4A-4C. Each alignment nub 400 may be or include a rigid protrusion (i.e., a nub) extending from the surface of stylus docking slot 220 configured to removably couple to beveled recess 310 of stylus 170 as described above with respect to FIGS. 4A-4C. In step 540, the one or more charging contacts may provide power to an energy storage unit of the stylus via the one or more spring contacts to charge the stylus for use. The power may be generated by a battery of the information handling system. For example, charging contacts 420 may provide power to energy storage unit 330 of stylus 170 via spring contacts 300 to charge stylus 170 for use as described above with respect to FIG. 4C. Battery 120 may generate and provide power to charging contacts 420 of keyboard 180 such that keyboard 180 may provide the power generated by battery 120 to stylus 170 to charge stylus 170 for use as described above with respect to FIG. 1.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A bidirectional charging system for a stylus of an information handling system, comprising:
   the stylus; and
   a keyboard communicably coupled to the information handling system, the keyboard configured to:
      receive, by a stylus docking slot of the keyboard, the stylus;
      cause, by a plurality of keyboard magnets of the keyboard, a partial alignment of the stylus in relation to the stylus docking slot, the plurality of keyboard magnets attracting a plurality of stylus magnets of the stylus;
      cause, by an alignment nub of the keyboard, an alignment of one or more spring contacts of the stylus in relation to one or more charging contacts of the keyboard, the alignment nub configured to removably couple to a beveled recess of the stylus; and
      provide, by the one or more charging contacts, power to an energy storage unit of the stylus via the one or more spring contacts to charge the stylus for use, the power generated by a battery of the information handling system.

2. The bidirectional charging system of claim 1, wherein the keyboard includes an additional alignment nub disposed opposite the alignment nub, the additional alignment nub including an additional one or more charging contacts disposed within the additional alignment nub.

3. The bidirectional charging system of claim 2, wherein the bidirectional charging system is further configured to:
   cause, by the additional alignment nub, an additional alignment of the one or more spring contacts in relation to the additional one or more charging contacts, the additional alignment nub configured to removably couple to the beveled recess.

4. The bidirectional charging system of claim 1, wherein the one or more spring contacts are disposed within the beveled recess of the stylus.

5. The bidirectional charging system of claim 1, wherein the one or more charging contacts are disposed within the alignment nub.

6. The bidirectional charging system of claim 1, wherein the plurality of keyboard magnets is disposed within the stylus docking slot.

7. The bidirectional charging system of claim 1, wherein the energy storage unit is an electric double-layer capacitor (EDLC).

8. A method for charging a stylus of an information handling system, the method comprising:
   receiving, by a stylus docking slot of a keyboard of the information handling system, the stylus, the keyboard communicably coupled to the information handling system;
   causing, by a plurality of keyboard magnets of the keyboard, a partial alignment of the stylus in relation to the stylus docking slot, the plurality of keyboard magnets attracting a plurality of stylus magnets of the stylus;
   causing, by an alignment nub of the keyboard, an alignment of one or more spring contacts of the stylus in relation to one or more charging contacts of the keyboard, the alignment nub configured to removably couple to a beveled recess of the stylus; and
   providing, by the one or more charging contacts, power to an energy storage unit of the stylus via the one or more spring contacts to charge the stylus for use, the power generated by a battery of the information handling system.

9. The method of claim 8, wherein the stylus docking slot includes an additional alignment nub disposed opposite the alignment nub, the additional alignment nub including an additional one or more charging contacts disposed within the additional alignment nub.

10. The method of claim 9, further comprising:
    causing, by the additional alignment nub, an additional alignment of the one or more spring contacts in relation to the additional one or more charging contacts, the additional alignment nub configured to removably couple to the beveled recess.

11. The method of claim 8, wherein the one or more spring contacts are disposed within the beveled recess of the stylus.

12. The method of claim 8, wherein the one or more charging contacts are disposed within the alignment nub.

13. The method of claim 8, wherein the plurality of keyboard magnets is disposed within the stylus docking slot.

14. The method of claim 8, wherein the energy storage unit is an electric double-layer capacitor (EDLC).

15. A keyboard for an information handling system, comprising:
    a stylus docking slot configured to receive a stylus;
    a plurality of keyboard magnets configured to cause a partial alignment of the stylus in relation to the stylus docking slot, the plurality of keyboard magnets attracting a plurality of stylus magnets of the stylus;
    an alignment nub configured to cause an alignment of one or more spring contacts of the stylus in relation to one or more charging contacts of the keyboard, the alignment nub configured to removably couple to a beveled recess of the stylus; and the one or more charging contacts configured to provide power to an energy storage unit of the stylus via the one or more spring contacts to charge the stylus for use, the power generated by a battery of the information handling system.

16. The keyboard of claim 15, wherein the keyboard includes an additional alignment nub disposed opposite the alignment nub, the additional alignment nub including an additional one or more charging contacts disposed within the additional alignment nub.

17. The keyboard of claim 16, wherein the keyboard is further configured to:
cause, by the additional alignment nub, an additional alignment of the one or more spring contacts in relation to the additional one or more charging contacts, the additional alignment nub configured to removably couple to the beveled recess.

18. The keyboard of claim 15, wherein the one or more spring contacts are disposed within the beveled recess of the stylus.

19. The keyboard of claim 15, wherein the one or more charging contacts are disposed within the alignment nub.

20. The keyboard of claim 15, wherein the energy storage unit is an electric double-layer capacitor (EDLC).

* * * * *